T. S. GRIMES.
GEAR MECHANISM FOR COTTON GIN FEEDERS.
APPLICATION FILED FEB. 16, 1909.
978,877.
Patented Dec. 20, 1910.
2 SHEETS—SHEET 2.
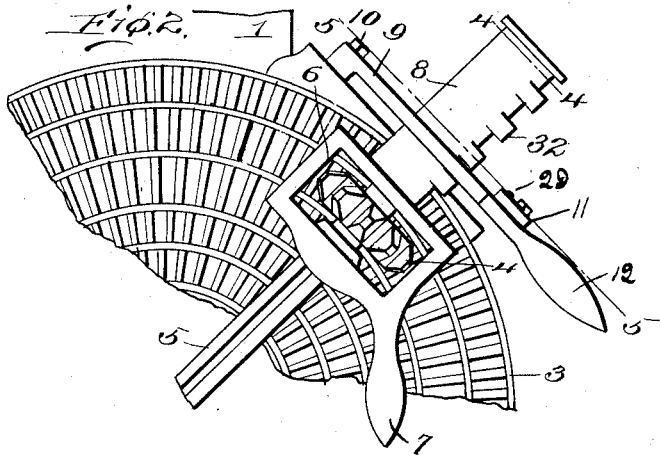
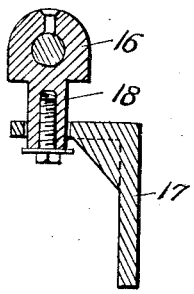
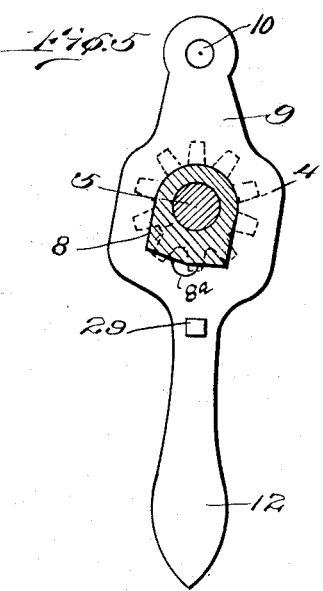
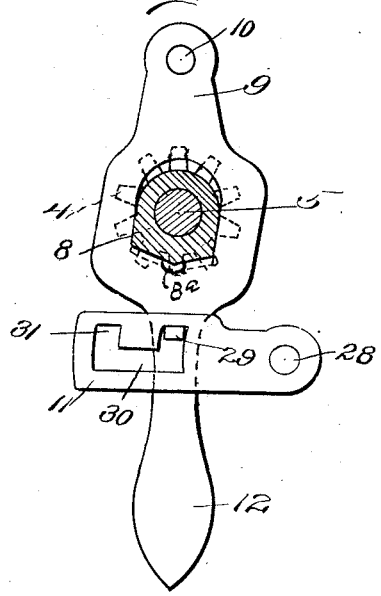
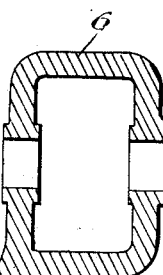

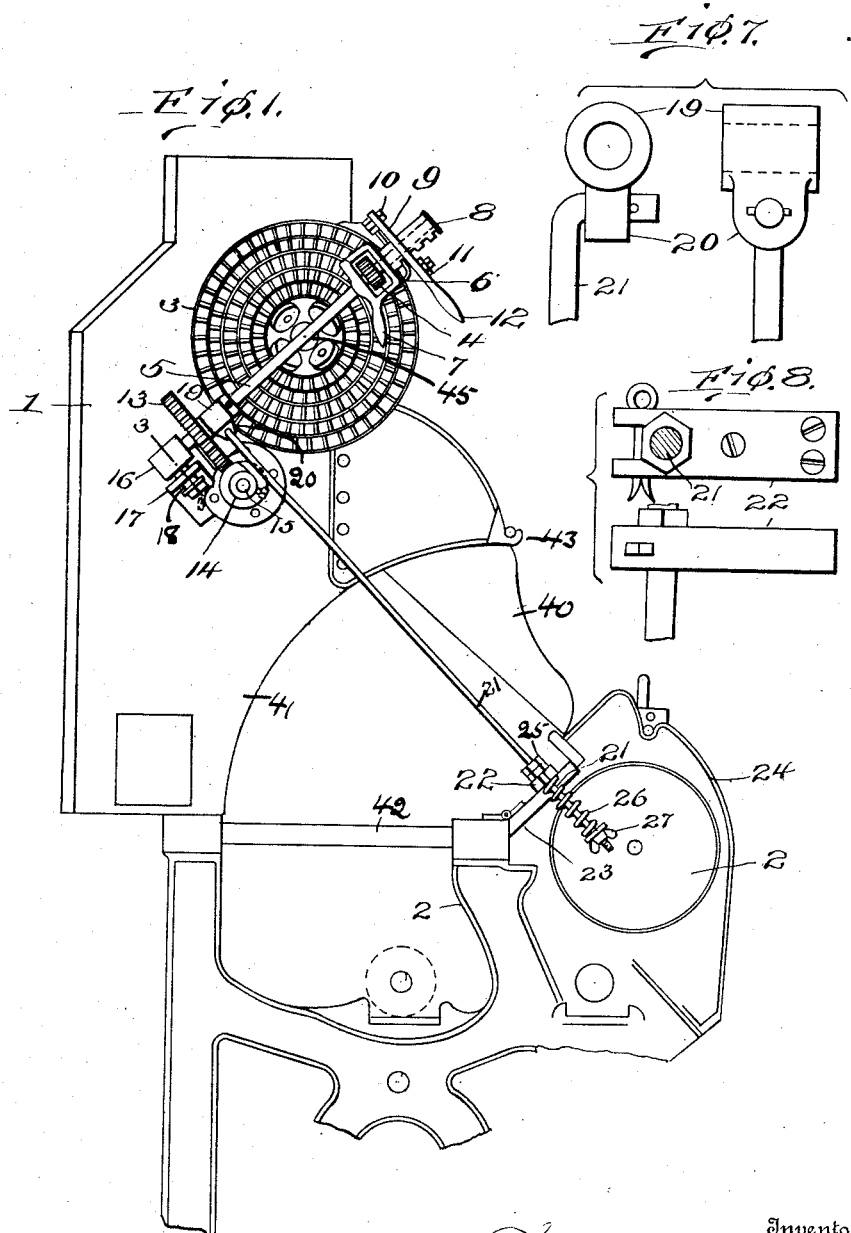

UNITED STATES PATENT OFFICE.

THADDEUS S. GRIMES, OF COLUMBUS, GEORGIA, ASSIGNOR TO F. H. LUMMUS SONS COMPANY, A CORPORATION OF GEORGIA.

GEAR MECHANISM FOR COTTON-GIN FEEDERS.

978,877.

Specification of Letters Patent. Patented Dec. 20, 1910.

Application filed February 16, 1909. Serial No. 478,230.

*To all whom it may concern:*

Be it known that I, THADDEUS S. GRIMES, a citizen of the United States, residing at Columbus, in the county of Muscogee and State of Georgia, have invented certain new and useful Improvements in Gear Mechanism for Cotton-Gin Feeders; and I do hereby declare the following to be a full, clear, and exact description of the invention, such as will enable others skilled in the art to which it appertains to make and use the same.

This invention relates to feed mechanism for cotton gins, and more particularly to means for regulating the feed.

The invention consists in the novel construction hereinafter described and claimed.

In the accompanying drawings: Figure 1 is a side elevation of a cotton gin feeder and part of a cotton gin, the same having connected therewith a gear mechanism constructed in accordance with my invention. Fig. 2 is an enlarged detail fragmentary view disclosing the translating mechanism for adjusting the position of the pinion for varying the speed of the machine. Fig. 3 is a detail fragmentary sectional view approximately on line 3—3 of Fig. 1. Fig. 4 is a fragmentary view partly in section taken approximately on line 4—4 of Fig. 2 with the translating rack in position for engaging its retaining support. Fig. 5 is a fragmentary sectional view taken approximately on line 5—5 of Fig. 2. Fig. 6 is a longitudinal sectional view through the translating rack. Fig. 7 shows detail views of a special collar to which is attached a reciprocating rod connected to the gin breast. Fig. 8 shows detail views of a guide bracket attached to the gin breast.

Referring to the accompanying drawings, 1 indicates a cotton gin feeder of any desired kind, and 2 a cotton gin. Connected with the cotton gin feeder is a disk gear 3 which drives the shaft 45 of one of the rolls of the feeder. Gear 3 is driven by a pinion 4 that may be brought into mesh with any of the sets of gear teeth on gear 3. The pinion 4 is slidably mounted on a rotatable shaft 5 but is splined thereto so as to be rotated thereby. The pinion 4 is mounted in a framework or housing 6 which is provided with a handle 7 for easy manipulation. The housing 6 is rigidly connected with a rack 8 that is provided with an aperture passing therethrough for accommodating shaft 5 and permitting it to rotate freely therein. The rack 8 is mounted to reciprocate upon shaft 5 in order to translate housing 6 and pinion 4 whenever desired. The rack 8 is engaged by a pivotally mounted lever 9 that is pivotally mounted at 10 to the gin feeder and is locked against movement by a latch 11 near the opposite end. A gripping member or handle 12 is provided for easy movement of the lever. The latch 11 may be operated for holding the rack 8 outward from gear 3 sufficiently far to prevent pinion 4 from meshing with the teeth thereof, or the same may be locked in such position as to hold pinion 4 in mesh with gear 3. This will permit a proper reciprocation of pinion 4 in order that the same may be brought into engagement with any series of gear teeth on gear 3.

Shaft 5 has rigidly secured thereto a worm wheel 13 which is arranged to mesh with a worm 14 which in turn is rigidly secured to a power shaft 15. Shaft 5 extends beyond gear wheel 13 and is journaled in a bearing 16 which in turn is supported by a bracket or supporting member 17. The bracket or supporting member 17 will permit a free reciprocation of the sleeve or projection 18 of bearing 16 sufficiently for disengaging the gear wheel 13 from worm 14, but is not adapted to be moved beyond support 17. Connected with projection 20 of sleeve 19 is a reciprocating rod 21 that passes through a supporting bracket 22 secured to the hinge rail 23 of the gin breast 24. Adjusting nuts 25 are interposed on rod 21 in order to vary the length thereof as occasion may require. Also a spring 26 is provided which bears against bracket 22 and against an adjusting nut 27 that is mounted on rod 21. This spring is designed to yieldingly hold the gear wheel 13 in engagement with worm 14. By the adjusting of nut 27 the pressure used in holding gear wheel 13 into engagement with worm 14 may be varied as occasion may require. By this construction and arrangement a changeable speed gearing is provided for regulating the rate of speed of the gin feeder, and also improved means are associated with the driving gear for the gin feeder which starts and stops the feeding of cotton automatically with the raising and lowering of the gin breast. When the breast is raised rod 21 moves the lower end of shaft 5 upwardly causing gear 13 carried thereby to be thrown out of engagement with worm 14, thus stopping the revolution of gear 3 and also stopping the revolution of the roll of the feeder carried by the shaft on which gear 3 is mounted. A chute 40 for conveying the cotton from the feeder to the roll box occupies a portion of the space between the edge 41 of the frame of the feeder and the top 42 of the gin proper. This chute 40 is pivoted at 43 and swings upon its pivot when the gin breast is raised. When the breast is lowered the rod 21 tends to return to the position shown in Fig. 1 and gear 13 reëngages worm 14 at the earliest period possible without damage to the gear teeth, the worm being rotated continuously while gear 13 is disengaged therefrom. The action of spring 26 permits the engagement of gear 13 with worm 14 without injury thereto by inducing or yieldingly forcing the return of gear 13 into engagement with the worm. It will thus be noted that the feed rolls may have their speed varied as occasion may require, and when the cotton is not being properly fed the feeder may be entirely stopped by throwing pinion 4 out of mesh with disk gear 3 or by raising the gin breast 24 for inspection or other purposes. Whenever it is desired to vary the speed of the fed roller operated through the medium of gear 3, latch 11 is moved upon its pivot point 28 until pin 29 has moved out into passage way 30 and then lever 9 moved upon its pivot 10 for moving pinion 4 out of engagement with gear 3. Rack 8 being disengaged pinion 4 can now be shifted from one series of teeth of gear 3 to another series by moving frame 6 connected with said rack and operated by lever 7. After the pin 29 has been moved to the extreme end of passage way 30 latch 11 is again moved until the pin is in engagement with recess 31 where it locks lever 9 against movement in an outer position and locks pinion 4 out of engagement with gear 3. The pinion 4 may then be reciprocated upon its shaft 5 until the pinion is opposite any of the concentrically arranged sets of gear teeth on gear 3, the teeth of rack 8 passing through notch 8ª as the rack and pinion are shifted longitudinally along the shaft. Latch 11 may then be moved so as to permit lever 9 to be swung inwardly and consequently move pinion 4 into engagement with gear wheel 3. Latch 11 then is moved to the position shown in Fig. 4.

What I claim is:

1. In a device of the class described, a shaft arranged to carry a gin feeding roll, a wheel having a plurality of series of teeth mounted on the shaft, a second shaft arranged transversely of the shaft first mentioned, a pinion slidable on the second shaft and arranged to engage the teeth of one of the aforesaid series, and means for shifting the pinion on the second shaft, such means comprising a member carried by the shaft last mentioned and provided with notches on a portion of its outer surface and an enlarged portion connected with the member aforesaid and inclosing the pinion, an operating arm secured to the enlarged portion, and a pivoted arm provided with an aperture for receiving the notched member, the edge of the aperture engaging the notches, and a device for holding the pivoted arm in a given position.

2. In a device of the class described, a shaft arranged to carry a gin feeding roll, a wheel having a plurality of series of teeth mounted on the shaft, a second shaft arranged transversely of the shaft first mentioned, a pinion slidable on the second shaft and arranged to engage the teeth of one of the aforesaid series, and means for shifting the pinion on the second shaft, such means comprising a member carried by the shaft last mentioned and provided with notches on a portion of its outer surface and an enlarged portion connected with the member aforesaid and inclosing the pinion, an operating arm secured to the enlarged portion, and a pivoted arm provided with an aperture for receiving the notched member, the edge of the aperture engaging the notches, a projection on the pivoted arm, and a catch provided with a U-shaped opening arranged to engage the projection and hold the pivoted arm in a position for retaining the notched member, the shaft and pinion, so that the latter will be held against the wheel first mentioned and at times out of contact therewith.

3. In a device of the class described, the combination with a gin feeder, of gear mechanism for driving such feeder, a rotating shaft connected to said gear mechanism for moving the same, a gear connected with said shaft, a worm adapted to mesh with such gear for driving the latter and said shaft, a bearing member for supporting one end of said shaft, a bracket provided with an aperture for supporting the bearing member, such bearing member comprising an enlarged portion provided with a bearing, a shank portion arranged to partly rotate in the apertured bracket and having a limited amount of play therein in a direction at an angle to the direction of rotation, and a securing device on the inner end of the shank portion.

In testimony whereof I affix my signature in presence of two witnesses.

THADDEUS S. GRIMES.

Witnesses:
E. F. MURRAY,
C. C. HARTPENCE.